Figure 1:
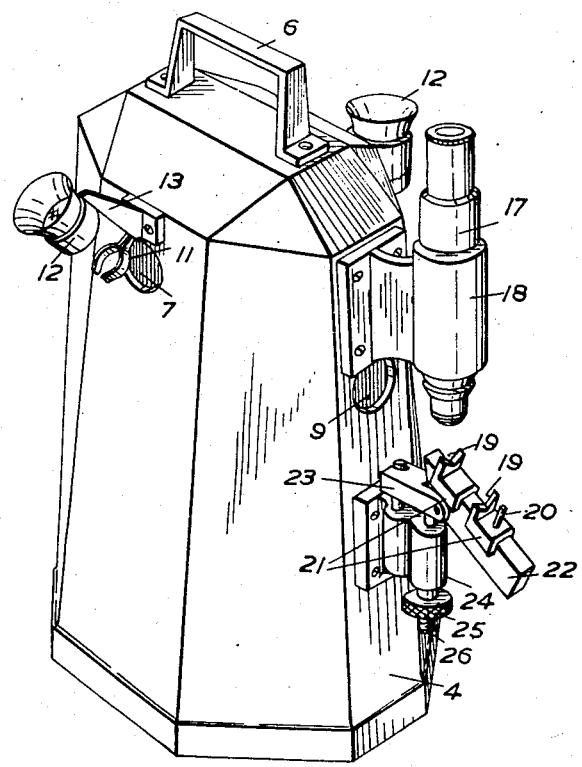

July 6, 1954

L. HARTRIDGE 2,682,799

DEVICE FOR EXAMINING DIESEL ENGINE
INJECTORS AND OTHER ARTICLES

Filed Sept. 15, 1950

2 Sheets-Sheet 1

Inventor
LESLIE HARTRIDGE
By
Attorney

Inventor
LESLIE HARTRIDGE
By *[signature]*
Attorney

Patented July 6, 1954

2,682,799

UNITED STATES PATENT OFFICE 2,682,799

DEVICE FOR EXAMINING DIESEL ENGINE INJECTORS AND OTHER ARTICLES

Leslie Hartridge, Buckingham, England

Application September 15, 1950, Serial No. 185,046

Claims priority, application Great Britain September 29, 1949

1 Claim. (Cl. 88—14)

This invention has reference to a new or improved device for examining the surfaces of small articles, including the insides of bores, and is particularly suitable for examining parts of the nozzles of compression ignition engines including both the seats in the nozzle body and the needle seats, whereby the condition of the surfaces, profiles or other characteristics thereof can be readily ascertained. More particularly, the present invention has for its object a device which enables internal surfaces, such as the needle seat of a compression ignition engine injector, to be readily examined.

The device according to the invention comprises a lamp house carrying an optical magnifying means, which may be a simple lens or a system of lenses and means for supporting a piece of apparatus to be examined in the optical field of the magnifying means, the lamp house being arranged to project light to the part of the article to be examined so that said part can be examined through the magnifying means. Preferably, the apparatus includes means for projecting light into the interior of a part to be examined, said means may comprise a reflector arranged to throw a pencil of light in such direction that optimum illumination is obtained. The lamp house may also be arranged so that the light is thrown directly onto the surface to be examined, such as the seat previously mentioned, or is directed somewhat obliquely into the piece of apparatus and, through one or more reflected paths, strikes the said surface. A refractor may be used in place of a reflector. The light will usually be arranged to strike an internal area of the part to be examined before actually striking the surface to be examined in cases where the reflecting or refracting means would interrupt the line of vision to the said surface, since by adopting this method of illuminating the said surface the reflector or refractor can be arranged out of the said line of vision.

The preferred form of the apparatus comprises a lamp house, conveniently of pyramidal form and open at the bottom, provided with a plurality of light egress apertures and with work-holding elements positioned externally of the lamp house so that the light is directed in the manner appropriate for illuminating a surface to be examined, and with optical magnifiyng means positioned in relation to the said surface so that a magnified image of the said surface is made available to the user of the apparatus. The several apertures are intended for examining different objects, e. g. for examining the interior seats of injector nozzles—both those having a concentric delivery orifice as well as those having a closed end—and the seating surface of the needles used with such nozzles. In the cases of nozzles having an end orifice, the light is preferably admitted obliquely through said orifice, whereas in the case of nozzles having a closed end (with lateral delivery orifices) light is preferably admittend from the open end of the nozzle using the reflector system mentioned above; it being positioned slightly to one side of the axis of the nozzle so that the interior, and particularly the seat thereof, as so illuminated, can be examined by the optical means mentioned.

These several features of the invention will be more fully understood for the following description of a preferred form thereof; it being understood that the invention is particularly applicable for use in the production and reconditioning of injector nozzles and needles for compression ignition engines. The reconditioning of such parts in particular involves the operation of lapping the needle seats and the mating seats in the nozzles and the provision of means for examining such seats is of great importance in control of the lapping, permitting the work to be efficiently done with the least loss of time.

Figure 2:
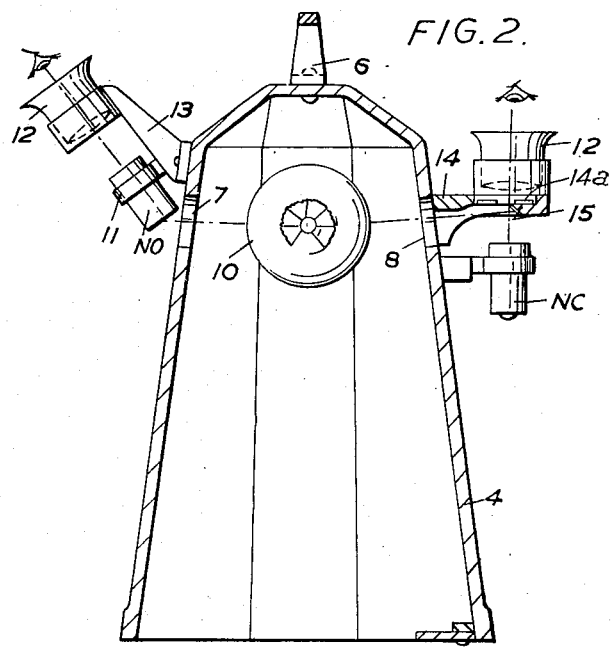
Figure 3:
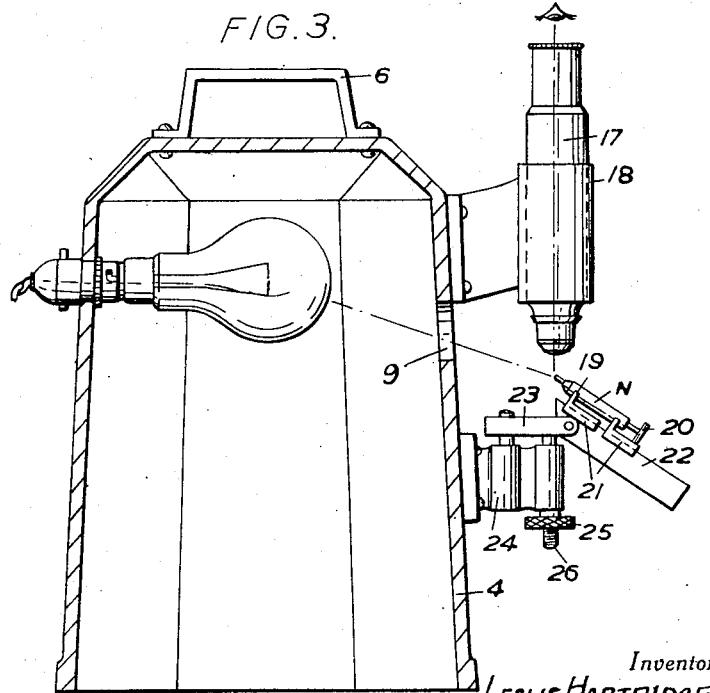

Fig. 1 is a general perspective view of apparatus according to the invention, and Figs. 2 and 3 are cross sectional views taken at right angles one to the other.

The apparatus shown comprises a lamp house 4, preferably in the form of a metal casting open at the bottom, although the bottom may be closed by a cover if desired. The lamp house may moreover be of the pyramidal form shown although other shapes may of course be used and it may be provided with a lifting handle 6. Light apertures 7, 8 and 9 are provided in the lamp house, whereby light from an electric lamp bulb 10, mounted preferably as shown, may be projected out through the apertures 7, 8 and 9. Mounted adjacent said apertures are work holders, preferably comprising in the case of the apertures 7 and 8, spring clips 11 suitable to grip injector bodies so as to hold them in positions giving adequate illumination of the part of body, normally the internal needle seat, which it is desired to subject to examination. Optical magnifying means such as eyepieces 12 are provided to present to an operator a magnified image of the part to be examined.

On the drawings there is shown adjacent the aperture 7 the means for examining a nozzle NO having a concentric delivery orifice, i. e. for use with a pintle needle; in this case the nozzle is positioned obliquely to the light path through the aperture, being mounted in a clip 11 fixed to a bracket 13 carrying the eyepiece 12. Experiment has shown that this arrangement ensures good illumination of the seat in the nozzle and permits satisfactory examination thereof through the eyepiece.

Adjacent the aperture 8 is shown the means for examining a nozzle NC having a closed end with lateral delivery orifices, which could not be effectively illuminated in the same manner as the nozzles NO. In this case adjacent the aperture 8 is disposed a carrier 14 supporting an iris diaphragm 14a and an eyepiece 12 in line with the bore of the nozzle NC and a reflecting surface 15 is positioned adjacent the axis of the bore and of the eyepiece but slightly beyond it in the direction of the light path from the source, so that a pencil of light is thrown in a slightly oblique direction into the bore without however interfering with the optical examination of the nozzle seat through the eyepiece. This oblique direction of the light, present also in the case of the nozzle NO is an important feature for securing an illumination of the seat of such character that any faults, scoring or unevenness of the seat for the needle is made apparent.

It is preferred to position the lamp bulb as shown, i. e. essentially with the plane of the filament thereof positioned so as intersect the nozzles NO or NC under examination. The vertically extended field of illumination so obtained is an important factor in securing the desirable quality of illumination of the seat in the nozzle. In this connection the desirability of enhancing the optical contrast of any unevenness or scoring of the seat must be emphasized, the arrangement of the invention ensuring that, for this purpose, at least some of the light entering the nozzle is directed over the coned seat surface rather than normally thereto.

The light aperture 9 (Fig. 3) is intended for use with means for the examination of nozzle needles N for use with nozzles such as NO or NC. In this case an eyepiece 12 may be used as for the other examination means but as an alternative a low-power microscope 17 is shown, slidably mounted for coarse adjustment in a carrier 18. It will be observed that the aperture 9 lies at a rather lower level than the apertures 7 or 8 so that the emergent light travels in a somewhat downward direction, hence obliquely to the microscope 17. The nozzle N is lodged in guides 19 against a stop 20, both associated with slides 21 slidable on a carrier bar 22 pivoted to a mount 23 itself mounted in a vertically adjustable manner in a carrier 24 fixed to the side of the lamp house 4. Vertical adjustment may be effected by means of a captive knurled nut 25 on screwed spindle 26 which directly supports mount 23. This permits fine focussing adjustment of the nozzle needle N. Moreover the carrier bar 22 may be rotated until a position is found which gives a desirable quality of illumination of the needle seat.

If desired, light passing through the light apertures 7, 8 or 9 may be projected by the use of suitable lenses.

It will be noted that an advantage of the present invention, particularly as applied to the examination of compression ignition engine injectors, is that there is little or no need to touch the magnifying means during the course of an examination: therefore, oil and dirt does not quickly get on the magnifying means and adversely affect its efficiency.

What I claim is:

A device for the direct visual examination of the surfaces of small articles, comprising a self-contained, tower-shaped lamp house adapted to rest on a horizontal support surface and having a plurality of light apertures in different side walls thereof, light source means located within said lamp house, means carried by the outer surfaces of said walls of the lamp house to hold articles for examination adjacent the said apertures externally of said lamp house and spaced therefrom, the surfaces of said articles to be examined being illuminated through said apertures, and optical magnifying means positioned wholly externally on said lamp house walls in positions appropriate for examination of the surfaces under examination, said holding means comprising a spring clip on one wall of said lamp house adjacent one aperture for holding one class of article, a clip support on a second wall of said lamp house adjacent a second aperture for supporting another class of article below said aperture, and vertically adjustable article support on a third wall of said lamp house below a third aperture, and said optical magnifying means comprising a magnifying lens carried by a bracket on said one wall adjacent said spring clip, the relative positions between said spring clip and said magnifying lens being selected to secure illumination of the surface under treatment and to give a magnifying image of said surface, a second lens in a mounting on said second wall adjacent said second aperture and a mirror positioned obliquely on said second wall against said second aperture and close to the axis of the second lens, whereby light emanating from said second aperture is thrown downwardly on to the article to illuminate a surface thereof while permitting examination of said surface through said second lens, and a microscope mounted on the third wall of said lamp-house above said third aperture and positioned for examination of part of the surface of the article illuminated through said third aperture.

References Cited in the file of this patent

UNITED STATES PATENTS

| Number | Name | Date |
| --- | --- | --- |
| 1,007,760 | Williams | Nov. 7, 1911 |
| 1,199,943 | Taylor | Oct. 3, 1916 |
| 1,504,989 | Spitzer | Aug. 12, 1924 |
| 1,564,432 | Marcuse et al. | Dec. 8, 1925 |
| 1,615,216 | Cruger | Jan. 25, 1927 |
| 1,865,028 | Mallina | June 28, 1932 |
| 1,936,712 | Foster | Nov. 28, 1933 |
| 1,956,247 | Oetzel | Apr. 24, 1934 |
| 2,071,408 | Jones | Feb. 23, 1937 |
| 2,129,759 | Goldman | Sept. 13, 1938 |
| 2,208,882 | Graff et al. | July 23, 1940 |
| 2,227,898 | Grant | Jan. 7, 1941 |
| 2,234,460 | Mestre | Mar. 18, 1941 |
| 2,289,272 | Kibbe | July 7, 1942 |
| 2,318,856 | Hoffman | May 11, 1943 |
| 2,373,929 | Turrettini | Apr. 17, 1945 |
| 2,378,672 | Weiskopf | June 19, 1945 |
| 2,470,176 | Lindgren et al. | May 17, 1949 |
| 2,488,146 | Steinhaus | Nov. 15, 1949 |
| 2,506,498 | Fuller | May 2, 1950 |

FOREIGN PATENTS

| Number | Country | Date |
| --- | --- | --- |
| 393,892 | Great Britain | June 15, 1933 |